United States Patent
Cherney et al.

(10) Patent No.: US 8,672,069 B2
(45) Date of Patent: Mar. 18, 2014

(54) HYBRID VEHICLE WITH MULTIPLE ELECTRIC DRIVE SYSTEMS

(75) Inventors: Mark J. Cherney, Potosi, WI (US); Eric Vilar, Dubuque, IA (US)

(73) Assignee: Deere & Company, Moline, IL (US)

( * ) Notice: Subject to any disclaimer, the term of this patent is extended or adjusted under 35 U.S.C. 154(b) by 384 days.

(21) Appl. No.: 12/546,778

(22) Filed: Aug. 25, 2009

(65) Prior Publication Data

US 2011/0048827 A1    Mar. 3, 2011

(51) Int. Cl.
*B60K 6/46* (2007.10)

(52) U.S. Cl.
USPC ............... 180/65.245; 180/65.21; 180/65.22; 180/6.5; 180/24.07

(58) Field of Classification Search
USPC .............. 180/65.245, 65.21, 65.22, 6.2, 6.48, 180/6.5, 6.62, 24.06, 24.07
See application file for complete search history.

(56) References Cited

U.S. PATENT DOCUMENTS

| | | | |
|---|---|---|---|
| 2,437,011 A * | 3/1948 | Weier | 290/14 |
| 3,012,185 A * | 12/1961 | Johnson | 322/32 |
| 3,585,473 A | 6/1971 | Huxtable et al. | |
| 4,095,154 A | 6/1978 | Williamson | |
| 4,109,743 A * | 8/1978 | Brusaglino et al. | 180/65.245 |
| 4,335,429 A | 6/1982 | Kawakatsu | |
| 4,726,627 A | 2/1988 | Frait et al. | |
| 4,945,296 A * | 7/1990 | Satake | 318/538 |
| 5,237,260 A | 8/1993 | Takakado et al. | |
| 5,350,031 A * | 9/1994 | Sugiyama et al. | 180/65.245 |
| 5,589,758 A | 12/1996 | Blackmon et al. | |
| 5,680,908 A | 10/1997 | Reed | |
| 5,686,818 A * | 11/1997 | Scaduto | 180/65.1 |
| 5,722,502 A | 3/1998 | Kubo | |
| 5,887,674 A | 3/1999 | Gray, Jr. | |
| 6,054,844 A | 4/2000 | Frank | |
| 6,321,866 B1 | 11/2001 | Prohaska | |
| 6,490,945 B2 | 12/2002 | Bowen | |
| 6,499,370 B2 | 12/2002 | Bowen | |
| 6,577,483 B1 | 6/2003 | Steicher et al. | |
| 6,683,389 B2 * | 1/2004 | Geis | 290/40 C |
| 6,691,806 B2 * | 2/2004 | Wolfgang et al. | 180/6.7 |
| 6,702,709 B2 | 3/2004 | Bowen | |
| 6,716,126 B2 | 4/2004 | Bowen | |
| 6,831,429 B2 | 12/2004 | Fu | |
| 6,837,325 B2 * | 1/2005 | Shimizu | 180/68.5 |
| 6,877,578 B2 | 4/2005 | Krzesicki et al. | |
| 7,152,705 B2 * | 12/2006 | Alster et al. | 180/65.245 |
| 7,201,244 B2 | 4/2007 | Johnston et al. | |
| 7,202,625 B2 | 4/2007 | Adra et al. | |
| 7,261,663 B2 | 8/2007 | Miller et al. | |
| 7,298,102 B2 | 11/2007 | Sopko et al. | |
| 7,378,808 B2 | 5/2008 | Kuras et al. | |
| 7,466,087 B2 | 12/2008 | Musser | |

(Continued)

OTHER PUBLICATIONS

Background Information (prior art), Dec. 2010.

(Continued)

*Primary Examiner* — Hau Phan
*Assistant Examiner* — Bryan Evans
(74) *Attorney, Agent, or Firm* — Faegre Baker Daniels LLP

(57) ABSTRACT

A hybrid vehicle comprises an engine, a first traction element, a second traction element, a first electric drive system, and a second electric drive system. The engine is coupled operatively to the first traction element via the first electric drive system and to the second traction element via the second electric drive system.

18 Claims, 4 Drawing Sheets

(56) References Cited

U.S. PATENT DOCUMENTS

| | | |
|---|---|---|
| 7,586,286 B2 | 9/2009 | Cheng et al. |
| 7,621,262 B2 | 11/2009 | Zubeck |
| 7,640,084 B2 | 12/2009 | Musser |
| 7,672,770 B2 | 3/2010 | Inoue et al. |
| 2003/0205422 A1 | 11/2003 | Morrow et al. |
| 2004/0021437 A1 | 2/2004 | Maslov et al. |
| 2005/0246082 A1 | 11/2005 | Miki et al. |
| 2007/0012492 A1 | 1/2007 | Deng et al. |
| 2007/0278027 A1 | 12/2007 | Gray, Jr. et al. |
| 2008/0099257 A1* | 5/2008 | Betz et al. .................. 180/65.2 |
| 2009/0288408 A1 | 11/2009 | Tozawa et al. |
| 2010/0066292 A1 | 3/2010 | Gottemoller et al. |

OTHER PUBLICATIONS

How Stuff Works Article Regenerative Braking (14 pages) (prior art), Dec. 2010.
Hybrid Propulsion System (1 page) (prior art), Dec. 2010.
Hybrid Vehicle Drivetrain Article on Wikipedia (14 pages) (prior art), May 2010.
MadSci Network Post (Jul. 8, 1999) (2 pages).
Modeling and Analysis of DC Link Bus Capacitor and Inductor Heating Effect on AC Drives Part I (6 pages (Oct. 1997).
Toyota Hybrid Synergy Drive (one page) (prior art), Dec. 2010.
Toyota Technical Training Break System (8 pages) (prior art), Dec. 2010.

* cited by examiner

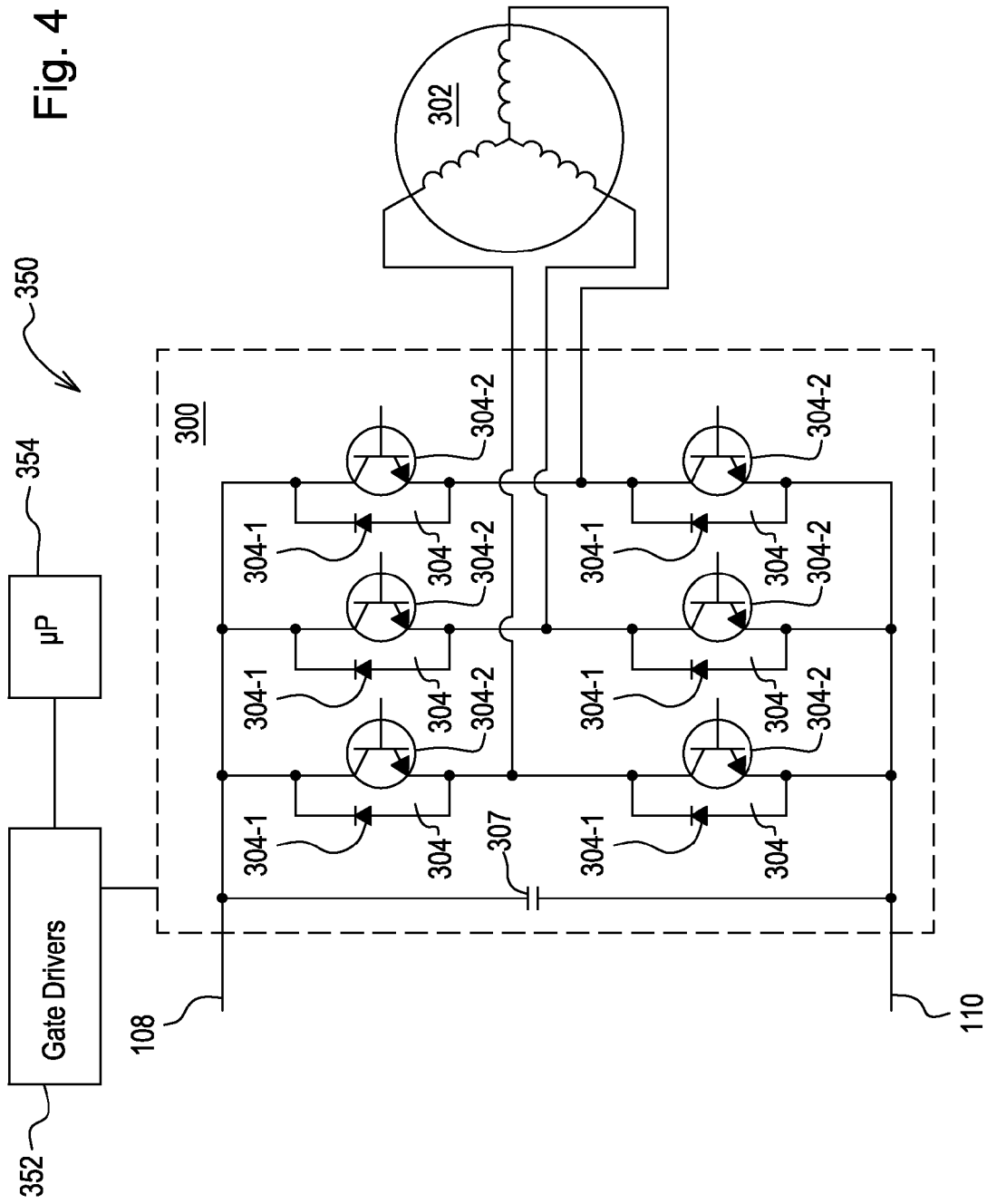

HYBRID VEHICLE WITH MULTIPLE ELECTRIC DRIVE SYSTEMS

FIELD OF THE DISCLOSURE

The present disclosure relates to a hybrid vehicle with an electric drive system.

BACKGROUND OF THE DISCLOSURE

Some large off-highway hybrid vehicles use power trains, which typically have a diesel engine powering a single large electric generator which then provides electric power to the electric traction motor(s) propelling the vehicle. For example, some electric mining trucks have diesel engine powering a single generator which provides electric power to two electric traction motors, one at each rear wheel. Also, some mining loaders have a diesel engine powering a single generator which provides electric power to four electric traction motors, one at each wheel. On large off-highway equipment, the generators are large, produced at low volumes, and expensive to manufacture.

SUMMARY OF THE DISCLOSURE

According to the present disclosure, a hybrid vehicle comprises an engine, a first traction element, a second traction element, a first electric drive system, and a second electric drive system. The first electric drive system comprises a first electric generator and a first electric traction motor coupled electrically to the first electric generator. Similarly, the second electric drive system comprises a second electric generator and a second electric traction motor coupled electrically to the second electric generator. The engine is coupled operatively to the first electric generator and the second electric generator such that power from the engine is split between the first and second electric generators. The first electric traction motor is coupled operatively to the first traction element, and the second electric traction motor is coupled operatively to the second traction element The first and second electric drive systems may be "quasi-parallel" with one another between the engine and the respective first and second traction elements in the sense that they provide two discrete power paths, in non-series relation to one another, between the engine and the respective traction elements. The first electric drive system may provide a first power path between the engine and the first traction element (and any other traction elements powered via the first electric drive system). The second electric drive system may provide a second power path, distinct from the first power path, between the engine and the second traction element (and any other traction elements powered via the second electric drive system).

Each electric drive system may further comprise its own electric bus for transmitting electric power between the generator and the traction motor. In particular, the first electric drive system may comprise a first electric bus coupled electrically to the first electric generator and the first electric traction motor therebetween. The second electric drive system may comprise a second electric bus coupled electrically to the second electric generator and the second electric traction motor therebetween.

The hybrid vehicle may further comprise a third traction element and a fourth traction element. The engine may be coupled operatively to the first and fourth traction elements via the first electric drive system and to the second and third traction elements via the second electric drive system.

The second electric drive system may comprise a third electric traction motor coupled electrically to the second electric generator and operatively to the third traction element, and the first electric drive system may comprise a fourth electric traction motor coupled electrically to the first electric generator and operatively to the fourth traction motor. As such, the first electric bus may be coupled electrically to the first electric generator and the first and fourth traction motors therebetween, and the second electric bus may be coupled electrically to the second electric generator and the second and third traction motors therebetween.

The first and second traction elements may be respectively right and left forward traction elements positioned on opposite sides of a central fore-aft axis of the hybrid vehicle, and the third and fourth traction elements may be respectively right and left rearward traction elements positioned on opposite sides of the fore-aft axis and rearward of the right and left forward traction elements. The first and second electric drive systems may thus be arranged in a crisscross pattern for best or otherwise enhanced load distribution between the two electric drive systems. This is so regardless if the traction of the vehicle is optimal fore/aft or right/left. For example, if the vehicle is oriented to travel along a side slope and traction is lost or reduced on one side of the vehicle due, for example, to wheel spin-out (e.g., from slip or weight shifting) or other cause, the tractive load on the other side of the vehicle will be distributed between the two electric drive systems. Similarly, if the vehicle is oriented to travel uphill or downhill and traction is lost or reduced in the front or rear due to such wheel spin-out or other cause, the tractive load at the opposite end of the vehicle will be distributed between the two electric drive systems.

Further, such a crisscross pattern may be particularly useful with a four-wheel drive loader. Since a four-wheel drive loader would tend to work the front electric traction motors harder than the rear electric traction motors during loading of the bucket or other work tool of the loader, the associated loading experienced by the front traction motors would be distributed between the two electric drive systems.

In an example, a four-wheel drive loader may have two electric drive systems. Each electric drive system may have an electric generator paired with two traction motors via an electric bus, and each traction motor may be associated with a respective traction element such as a ground engaging wheel to power that wheel.

In other examples, the number of traction motors of each electric drive system may be more or less than two. For example, a two-wheel drive vehicle (e.g., an automobile) may have two electric drive systems, each having an electric generator paired with a single electric traction motor via an electric bus to power one of the two drive wheels.

In a track-type vehicle, there may be an electric drive system for each track. In the case of two tracks (e.g., a dozer), there may be two electric drive systems, each associated with one of the tracks and having an electric generator paired with a single electric traction motor via an electric bus to power that track.

In another example, a forestry forwarder (e.g., 15 tonne rated payload or any other size) having, for example, eight ground-engaging wheels, a right forward wheel pair and a left forward wheel pair on the tractor and a right rearward wheel pair and a left rearward wheel pair on the trailer (i.e., the section with the wood bunk and boom with grapple), may have two electric drive systems, one for the right forward and left rearward wheel pairs and one for the left forward and right rearward wheel pairs (i.e., in a crisscross arrangement for effective travel despite, for example, weight distribution). As such, each electric drive system may have an electric generator paired with four electric traction motors, one for each wheel, via an electric bus to power the four wheels.

Thus, the arrangement of operating multiple electric drive systems with an engine could be applied to a variety of vehicle configurations, including those mentioned herein and others that one of ordinary skill in the art would recognize. Dual electric drive systems may also be applied to a six-wheeled vehicle, such as, for example, an articulated dump truck having two front wheels and four rear wheels.

The traction elements may take a variety of forms. For example, they may take the form of, without limitation, ground-engaging wheels of on-highway vehicles such as automobiles or off-highway vehicles such as construction, forestry, mining, or agricultural vehicles, rail-engaging wheels of locomotives, tracks of track-type vehicles, etc., to name but a few examples.

In general, the hybrid vehicle of the present application may have two or more electric drive systems, each electric drive system having, for example, an electric generator and one or more electric traction motors coupled electrically to the generator, with the engine of the vehicle coupled operatively to each generator to split power therebetween. The engine may be coupled directly or indirectly (e.g., through a gearbox) to the generators to establish a mechanical or other connection between the engine and each generator. The generator of each electric drive system can be paired with one or more electric traction motors of that system.

Vehicles with multiple (e.g., two) electric drive systems may give rise to a number of benefits, such as, for example, greater cost effectiveness, redundancy, and reduced complexity. Lower cost to a vehicle manufacturer may result from commonality of generators across different products of the manufacturer's fleet of hybrid vehicles, which may include different types of hybrid vehicles and/or different sizes within a vehicle type. For example, a smaller hybrid vehicle (e.g., six cubic yard load four-wheel drive loader) may call for only one smaller generator, whereas a larger hybrid vehicle (e.g., nine cubic yard load four-wheel drive loader) may call for one larger generator or, alternatively, two of the smaller generators and thus two electric drive systems. Using the two smaller generators, instead of the one larger generator, may result in overall cost effectiveness due to the commonality of the smaller generator across different products. In addition, the multiple electric drive systems are largely redundant meaning that a failure in one system does not affect the other system, allowing the vehicle to continue to operate at a reduced performance or be driven to a shop for service if there is a component failure. Further, the complexity of regulating voltage with multiple generators on a common bus is avoided.

The above and other features will become apparent from the following description and the attached drawings.

BRIEF DESCRIPTION OF THE DRAWINGS

The detailed description of the drawing refers to the accompanying figures in which:

FIG. 4 is a schematic view showing power electronics for a three-phase interior-permanent-magnet motor.

DETAILED DESCRIPTION OF THE DRAWINGS

Figure 1:
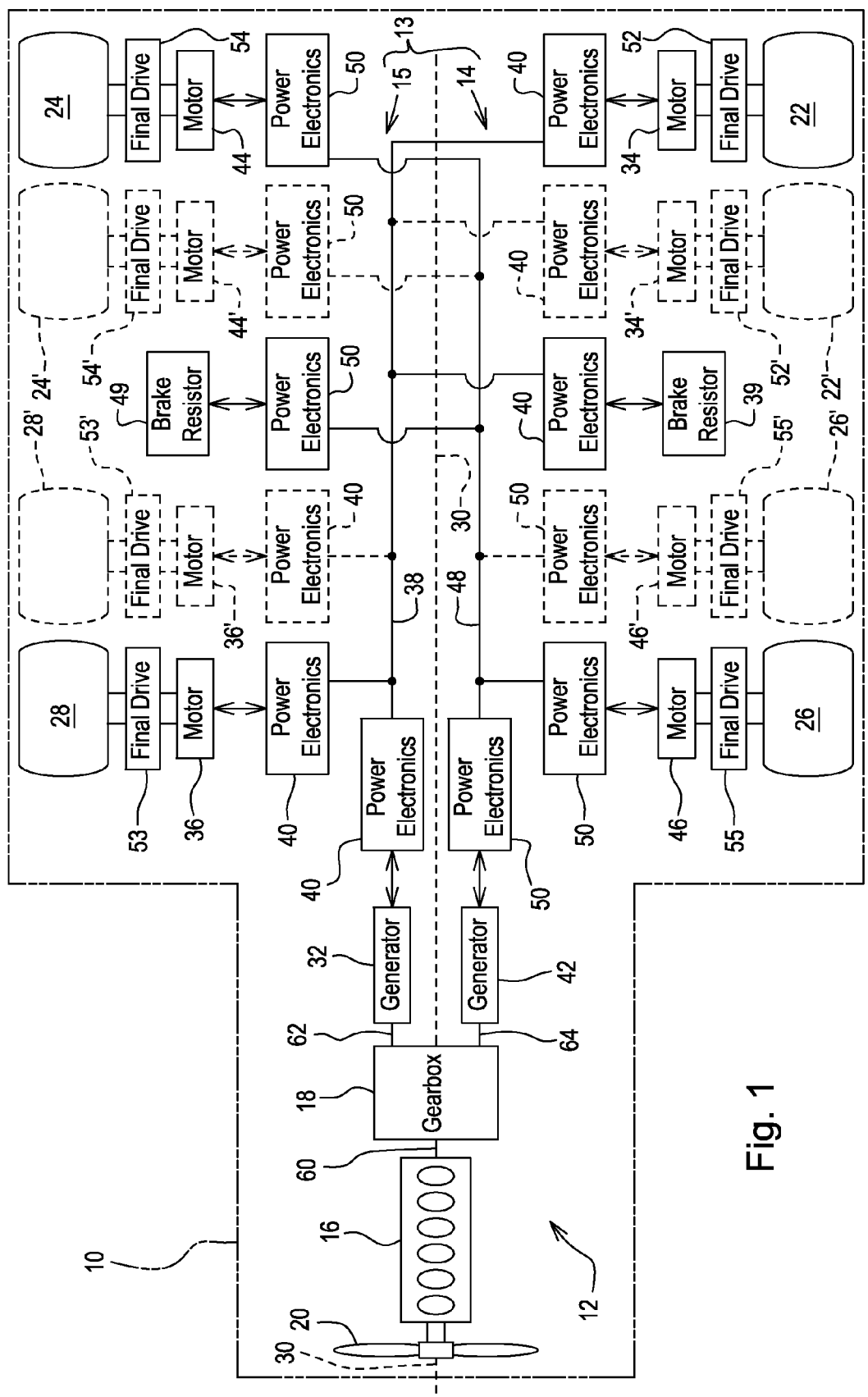
FIG. 1 is a diagrammatic view of a hybrid vehicle with a power train having dual electric drive systems through which an engine is coupled operatively to traction elements.

Referring to FIG. 1, there is shown an exemplary hybrid vehicle 10. The power train 12 of the vehicle 10 may have dual electric drive systems 14, 15.

The power train 12 may have an internal combustion engine 16 (e.g., a diesel engine or gasoline engine) and a gearbox 18, for engine gear reduction, through which the engine 16 may be coupled operatively and mechanically to the drive systems 14, 15 and through which power from the engine 16 may be split between the two drive systems 14, 15. The engine 16 may be coupled to a cooling fan 20 to drive the fan 20.

The power train 12 may include a right forward traction element 22, a left forward traction element 24, a right rearward traction element 26, and a left rearward traction element 28. The traction elements 22, 24, 26, 28 may be configured to engage the ground to propel the vehicle 10 and may be configured, for example, as ground-engaging wheels. The right and left forward traction elements 22, 24 may be positioned on opposite sides of a central fore-aft axis 30 of the vehicle 10, and the right and left rearward traction elements 26, 28 may be positioned on opposite sides of the fore-aft axis 30 and rearward of the right and left forward traction elements 22, 24.

The engine 16 may be coupled operatively to the right forward traction element 22 and the left rearward traction element 28 via the first electric drive system 14 and to the left forward traction element 24 and the right rearward traction element 26 via the second electric drive system 15 such that power from the engine 16 may be split between the first and second electric drive systems 14, 15.

The first and second electric drive systems 14, 15 may be "quasi-parallel" with one another between the engine 16 and the respective traction elements 22, 24, 26, 28 in the sense that they provide two distinct power paths, in non-series relation to one another, between the engine 16 and the respective traction elements 22, 24, 26, 28. The first electric drive system 14 may provide a first power path between the engine 16 and the right forward and left rearward traction elements 22, 28. The second electric drive system 15 may provide a second power path, distinct from the first power path, between the engine 16 and the left forward and right rearward traction elements 24, 26. Power flow between the engine 16 and the traction elements 22, 24, 26, 28 may be bi-directional.

The first and second electric drive systems 14, 15 may be arranged in a crisscross pattern in view of the fore/aft and right/left connections of the systems 14, 15. They may be arranged in such a crisscross pattern for best load distribution between the two electric drive systems 14, 15 regardless if the traction of the vehicle 10 is optimal fore/aft or right/left.

The first electric drive system 14 may include an electric generator 32, a right forward electric traction motor 34, a left rearward electric traction motor 36, and an electric bus 38 coupled electrically to the generator 32 and the motors 34, 36 between the generator 32 and the motors 34, 36. The engine 16 may be coupled operatively and mechanically to the generator 32 via the gearbox 18. The output of the engine 16 and the input of the gearbox 18 are mechanically coupled to one another by a mechanical connection 60 such that engine output and the gearbox input rotate together in unison. A first output of the gearbox 18 and the input of the generator 32 are mechanically coupled to one another by a mechanical connection 62 such that the first output of the gearbox 18 and the input of the generator 32 rotate together in unison. The right forward and left rearward electric traction motors 34, 36 may be respectively coupled operatively and mechanically to the traction elements 22, 28 via suitable final drives 52, 53.

The first electric drive system 14 may also include one or more electric loads coupled electrically to the bus 38 for use in dynamic braking (to dissipate electric energy as heat) or regenerative braking (to return electric energy to the supply system such as to one or more batteries and/or a bank of capacitors) in the event that one or both of the motors 34, 36 is driven as an electric generator. For example, it may include a brake resistor 39 coupled electrically to the bus 38 for dissipating electric energy from the motors 34, 36 as heat when the vehicle is decelerating (dynamic braking). The dissipated energy may be transferred as heat from the resistor 39 to liquid coolant.

The first electric drive system 14 may further include suitable power electronics 40 coupled electrically between the bus 38 and the generator 32, the bus 38 and the motors 34, 36, and the bus 38 and the brake resistor 39 or other electrical load(s). The power electronics 40 of the system 14 may manage the interconnection between the generator 32 and the motors 34, 36 with their motor loads, control the brake resistor 39, and include a number of power electronics modules, which contain sufficient microprocessor and power semiconductor technology to monitor and regulate the attached electromechanical devices. The power electronics 40 may be configured as one or more distinct power electronics modules. In an example, there may be a power electronics module for each of the generator 32, the motors 34, 36, and the brake resistor 39. In other examples, two or more of those power electronics modules may be integrated into a single module. Exemplarily, the system 14 may have a first power electronics module for both the generator 32 and the brake resistor 39, a second power electronics module for the motor 34, and a third power electronics module for the motor 36.

The second electric drive system 15 may include an electric generator 42, a left forward electric traction motor 44, a right rearward electric traction motor 46, and an electric bus 48 coupled electrically to the generator 42 and the motors 44, 46 between the generator 42 and the motors 44, 46. The engine 16 may be coupled operatively and mechanically to the generator 42 via the gearbox 18. A second output of the gearbox 18 and the input of the generator 42 are mechanically coupled to one another by a mechanical connection 64 such that the second output of the gearbox 18 and the input of the generator 42 rotate together in unison. The left forward and right rearward electric traction motors 44, 46 may be respectively coupled operatively and mechanically to the traction elements 24, 26 via suitable final drives 54, 55.

The second electric drive system 15 may also include one or more electric loads coupled electrically to the bus 48 for use in dynamic braking or regenerative braking in the event one or both of the motors 44, 46 is driven as an electric generator. For example, it may include a brake resistor 49 coupled electrically to the bus 48 for dissipating electric energy from the motors 44, 46 as heat when the vehicle is decelerating (dynamic braking). The dissipated energy may be transferred as heat from the resistor 49 to liquid coolant.

The second electric drive system 15 may further include suitable power electronics 50 coupled electrically between the bus 48 and the generator 42, the bus 48 and the motors 44, 46, and the bus 48 and the brake resistor 49 or other electrical load(s). The power electronics 40 of the system 15 may manage the interconnection between the generator 42 and the motors 44, 46 with their motor loads, control the brake resistor 49, and include a number of power electronics modules, which contain sufficient microprocessor and power semiconductor technology to monitor and regulate the attached electromechanical devices. The power electronics 50 may be configured as one or more discrete power electronics modules. In an example, there may be a power electronics module for each of the generator 42, the motors 44, 46, and the brake resistor 49. In other examples, two or more of those power electronics modules may be integrated into a single module. Exemplarily, the system 15 may have a first power electronics module for both the generator 42 and the brake resistor 49, a second power electronics module for the motor 44, and a third power electronics module for the motor 46.

As alluded to above, the engine 16 may be coupled operatively to both of the generators 32, 42. As such, power from the engine 16 may be split between the generators 32, 42 to flow through the systems 14, 15 to the respective traction elements 22, 24, 26, 28. This may occur indirectly through the gearbox 18 or other power splitter so as to split power indirectly from the engine 16 between the generators 32, 42, or may occur directly from two separate outputs of the engine 16 to the generators 32, 42, respectively, so as to split power directly from the engine 16 between the generators 32, 42.

The vehicle 10 may take the form of, for example, a hybrid work vehicle. Exemplarily, the vehicle 10 may be a four-wheel drive loader (e.g., nine cubic yard load). In such an example, the vehicle 10 may have a front section and a rear section coupled to one another at an articulation joint for pivotable movement of the front section relative to the rear section in response to operation of a pair of hydraulic articulation cylinders (a right articulation cylinder and a left articulation cylinder).

The front section may include a front frame, a boom pivotally coupled to the front frame, and a bucket pivotally coupled to the boom. A right hydraulic boom cylinder and a left hydraulic boom cylinder may be coupled to the front frame and the boom to raise and lower the boom and the bucket attached thereto. A right hydraulic bucket cylinder and a left hydraulic bucket cylinder may be coupled to the boom and a bucket linkage to roll the bucket forward and rearward relative to the boom. In other examples, there may be only one bucket cylinder.

The front section interfaces with the ground via its traction elements, each in the form of, for example, a wheel. In particular, the front section may include the right and left forward traction elements 22, 24, positioned on opposite sides of the axis 30, and the associated motors 34, 44 and final drives 52, 54.

The rear section may include a rear frame, an operator's station mounted to the rear frame and from which a human operator can control the vehicle 10, the engine 16 (e.g., diesel engine), a cooling package with the fan 20, and the generators 32, 42 and associated power electronics 40, 50. The rear section interfaces with the ground via its traction elements, each in the form of, for example, a wheel. In particular, the rear section may include the right and left rearward traction elements 26, 28 and the associated motors 46, 36 and final drives 55, 53. Each of the final drives 52, 53, 54, 55 of the loader may provide a fixed gear reduction. The right and left rearward traction elements 26, 28 may be positioned on opposite sides of the fore-aft axis 30 and rearward of the forward traction elements 22, 24. As such, the right forward and rearward traction elements 22, 26 may be positioned on the right side of the fore-aft axis 30, and the left forward and rearward traction elements 24, 28 may be positioned on the left side of the fore-aft axis 30. The power electronics 40, 50 and the brake resistors 39, 49 may be mounted in an electric cabinet of the rear section.

The engine 16 (e.g., diesel engine) may operate at a generally constant speed of, for example, 1800 rpm (the engine 16 may experience, or be allowed to experience, some minimal speed variation due to, for example, load on the engine). The gearbox 18 may provide an increase in speed from the engine 16 to each of the generators 32, 42, allowing the generators 32, 42 to be reduced in physical size and power (i.e., continuous load capacity), with an associated cost decrease. The volumetric size decrease of each generator 32, 42 may be roughly inversely proportional to such speed increase. In an example, the gearbox 18 may provide a 3:1 speed increase (ratio in form of output of gearbox:input of gearbox) for each generator 32, 42. The engine 16 may have a number of other outputs to operate hydraulic pump(s), etc. of the loader.

The generators 32, 42 may be three-phase interior-permanent-magnet (IPM) synchronous generators (e.g., each 200 kW continuous load capacity), and the motors 34, 36, 44, 46 motors may be three-phase switched reluctance (SR) motors (e.g., each 135 kW continuous load capacity), which have a relatively wide speed range. The buses 38, 48 of the loader may be two independent DC buses coupled operatively to and between the respective generator 32, 42 and the respective motors 34, 36 or 44, 46. Each system bus 38, 48 may nominally be 700 VDC.

The power electronics 40, 50 of each system 14, 15 manage the interconnection between the respective generator 32, 42 and the respective motors 34, 36, 44, 46 with their motor loads and include a number of power electronics modules, which contain sufficient microprocessor and power semiconductor technology to monitor and regulate the attached electromechanical devices.

Exemplarily, with respect to the system 14, there may be a first power electronics module for both the generator 32 and the brake resistor 39, a second power electronics module for the motor 34, and a third power electronics module for the motor 36, and, with respect to the system 15, there may be a first power electronics module for both the generator 42 and the brake resistor 49, a second power electronics module for the motor 44, and a third power electronics module for the motor 46.

Figure 2:
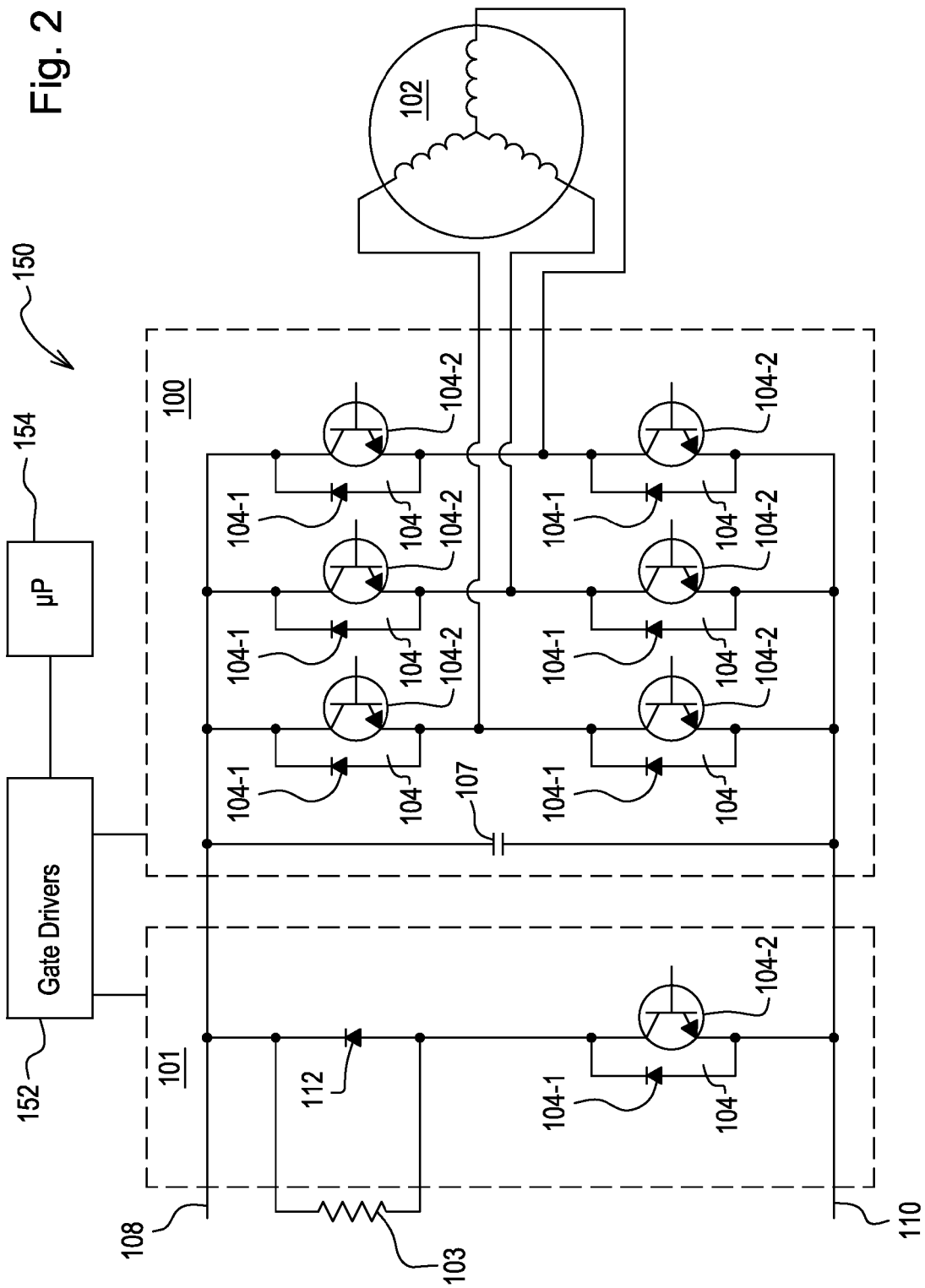
FIG. 2 is a schematic view showing power electronics for a generator and a brake resistor.

Referring to FIG. 2, each of the first power electronics modules, identified by 70, may include a typical power converter in the form of an AC-to-DC converter to convert three-phase AC power from the respective generator 32, 42 into DC power for the respective bus 38, 48 and may further include a brake chopper to control use of the respective brake resistor 39, 49 to dissipate power from the respective bus 38, 48. The power converter may take the form of the illustrated power converter 100, and the brake chopper may take the form of the illustrated brake chopper 101. Exemplarily, each generator 32, 42 is configured as a three-phase interior-permanent-magnet synchronous generator 102, and each brake resistor 39, 49 is represented as a resistor 103 configured, for example, as 10 discrete resistor elements coupled in parallel. When energy storage becomes more economical, the brake resistors 39, 49 may be significantly reduced in size or eliminated altogether.

The power converter 100 may include six insulated gate bipolar junction transistor (IGBT) packages 104, each IGBT package 104 including a diode 104-1 and an IGBT 104-2 (which can be viewed as a switch). Respective IGBT packages 104 may be coupled to a respective one of the generator phase coils to convert AC power from that coil (e.g., 480$V_{RMS}$ line-to-line) into DC power on the respective bus 38, 48 at a nominal voltage of, for example, 700 VDC between positive DC power rail 108 and negative DC power rail 110, the two rails 108, 110 cooperating to provide the respective bus 38, 48. A DC link capacitor 107 (e.g., 700 VDC) is provided between the power rails 108, 110.

The brake chopper 101 may include an IGBT package 104, with its diode 104-1 and IGBT 104-2, and a diode 112. The diode 112 may be in parallel with the resistor 103.

When the appropriate voltage is applied to the base of an IGBT 104-2 of the power converter 100, the switch (i.e., the IGBT) may be activated and the collector may be coupled electrically to the emitter to supply electric power. When the appropriate voltage is applied to the base of the IGBT 104-2 of the brake chopper 101, the switch (i.e., the IGBT) may be activated and the collector may be coupled electrically to the emitter to allow dissipation of electric power through the resistor 103.

The base of each IGBT 104-2 may be coupled electrically to a respective gate driver 152 that is dedicated to that IGBT 104-2 and provides a low voltage (e.g., 24 VDC) to turn on and off that IGBT 104-2. Thus, there may be a gate driver 152 for each IGBT 104-2 of the power converter 100 and of the brake chopper 101. The gate drivers 152 for the IGBTs 104-2 of the power converter 100 may be under the control of a microprocessor 154 (the microprocessor 154 and associated memory may be integrated on the same chip, such as a Texas Instruments chip), which may employ a pulse-width-modulation control scheme, such as one that is well-known to a person of ordinary skill in the art (e.g., space-vector modulation), to control those gate drivers 152 and the IGBTs 104-2 of the power converter 100 to output normally a constant nominal 700 VDC onto the respective bus 38, 48. The gate driver 152 for the IGBT 104-2 of the brake chopper 101 may be under the control of the microprocessor 154 (or other microprocessor) to control that gate driver 152, the IGBT 104-2 of the brake chopper 101, and the resistor 103 (e.g., in a hysteretic fashion) to keep the respective bus 38, 48 at the nominal 700 VDC. Each of the first power electronics modules 150 may thus include the power converter 100, the brake chopper 101, the gate drivers 152 (e.g., one for each IGBT 104-2), and the microprocessor 154.

Figure 3:
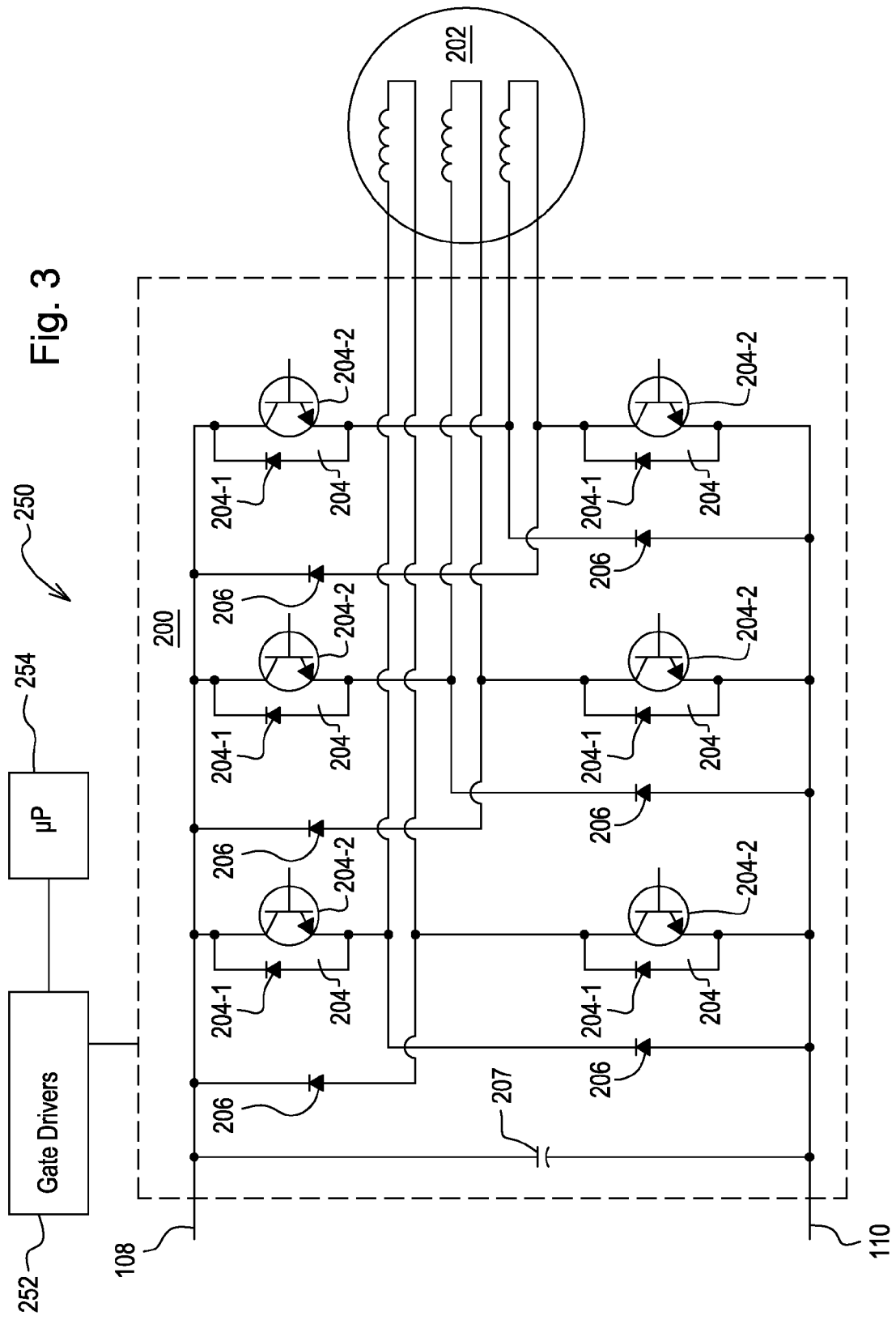
FIG. 3 is a schematic view showing power electronics for a three-phase switched reluctance motor.

Referring to FIG. 3, each of the second and third power electronics modules, identified as 250, may include a typical power converter in the form of a DC-to-AC inverter to convert DC power into three-phase AC power for the respective motor 34, 36, 44, 46. The power converter may take the form of the illustrated power converter 200, and each motor 34, 36, 44, 46 may be configured as a three-phase SR motor 202 having three phase coils (e.g., each coil 700$V_{RMS}$). Electric power at a nominal voltage of, for example, 700 VDC is provided to power converter 200 by positive and negative DC power rails 108, 110 of the respective bus 38, 48.

The power converter 200 may include six IGBT packages 204, each IGBT package 204 including a diode 204-1 and an IGBT 204-2 (which can be viewed as a switch), and six separate power diodes 206. Respective IGBT packages 204 and power diodes 206 may be coupled to a respective one of the motor phase coils to convert power to supply that coil. A DC link capacitor 207 (e.g., 700 VDC) is provided between the power rails 108, 110.

When the appropriate voltage is applied to the base of an IGBT 204-2 of the power converter 200, the switch (i.e., the IGBT) may be activated and the collector may be coupled electrically to the emitter to supply electric power. The base of each IGBT 204-2 may be coupled electrically to a respective gate driver 252 that is dedicated to that IGBT 204-2 and provides a low voltage (e.g., 24 VDC) to turn on and off that IGBT 204-2. The gate drivers 252 may be under the control of a microprocessor 254 (the microprocessor 254 and associated memory may be integrated on the same chip, such as a Texas Instruments chip) in common with those gate drivers 252 which may employ an SR-motor control scheme well-known to a person of ordinary skill in the art, or any other suitable SR motor control scheme, to control the gate drivers 252, the IGBTs 204-2, and thus the SR motor 202 (including varying the amplitudes and frequencies to the motor coils) so as to vary the torque output of that motor 202 when applicable. Each of the second and third power electronics modules 250 may thus include the power converter 200, the gate drivers 252 (e.g., one for each IGBT 204-2), and the microprocessor 254.

Referring to FIG. 4, it is contemplated that the electric drive systems 14, 15 of the forestry forwarder mentioned above (e.g., 15 tonne rated payload) may have the same type of electric components as the four-wheel drive loader, except that its motors may be three-phase interior-permanent-magnet (IPM) AC motors (e.g., each 30 kW continuous load capacity) with corresponding power electronics.

Similar to the four-wheel drive loader, the engine 16 of the forwarder (e.g., diesel engine) may operate at a generally constant speed of, for example, 1800 rpm (the engine 16 may experience, or be allowed to experience, some minimal speed variation due to, for example, load on the engine). The gearbox 18 may provide an increase in speed from the engine 16 to each of the generators 32, 42, allowing the generators 32, 42 to be reduced in physical size and power (i.e., continuous load capacity), with an associated cost decrease. The volumetric size decrease of each generator 32, 42 may be roughly inversely proportional to such speed increase. In an example, the gearbox 18 may provide a 3:1 speed increase (speed ratio in form of output of gearbox:input of gearbox) for each generator 32, 42. The engine 16 may have a number of other outputs to operate hydraulic pump(s), etc. of the forwarder.

The generators 32, 42 may be three-phase interior-permanent-magnet (IPM) synchronous generators (e.g., each 60 kW continuous load capacity). The buses 38, 48 of the forwarder may be two independent DC buses coupled operatively to and between the respective generator 32, 42 and the respective motors (each of the two electric drive systems having four electric traction motors for a total of eight electric traction motors aboard the forwarder). Each system bus 38, 48 may nominally be 700 VDC. As alluded to above, the generator 32, 42, resistors 39, 49, and first power electronics modules of the forwarder may be configured as described in connection with FIG. 2, and therefore need not be described again.

The forwarder has an electric traction motor for each of its eight traction elements (with a final drive therebetween). Accordingly, the forwarder may have the traction elements 22, 24, 26, 28, traction elements 22', 24', 26', 28' paired with the traction elements 22, 24, 26, 28, and electric traction motors 34, 34', 36, 36', 44, 44', 46, 46' operatively coupled respectively to traction elements 22, 22', 24, 24', 26, 26', 28, 28' via final drives 52, 52', 53, 53', 54, 54', 55, 55' respectively therebetween (each such final drive of the forwarder may provide a fixed gear reduction). Each electric drive system 14, 15 of the forwarder may have a power electronics module for each traction motor. Exemplarily, with respect to the system 14, there may be a second power electronics module for the motor 34, a third power electronics module for the motor 36, a fourth power electronics module for the motor 34', and a fifth power electronics module for the motor 36', and, with respect to the system 15, there may be a second power electronics module for the motor 44, a third power electronics module for the motor 46, a fourth power electronics module for the motor 44', and a fifth power electronics module for the motor 46'.

Each of the second, third, fourth, and fifth power electronics modules of the forwarder, identified as 350, may include a typical power converter in the form of a DC-to-AC inverter to convert DC power into three-phase AC power for the respective motor. The power converter may take the form of the illustrated power converter 300, and each motor may be configured as a three-phase interior-permanent-magnet motor 302 having three phase coils (e.g., $480V_{RMS}$ line-to-line). Electric power at a nominal voltage of, for example, 700 VDC is provided to power converter 300 by positive and negative DC power rails 108, 110 of the respective bus 38, 48.

The power converter 300 may include six IGBT packages 304, each IGBT package 304 including a diode 304-1 and an IGBT 304-2 (which can be viewed as a switch). Respective IGBT packages 304 may be coupled to a respective one of the motor phase coils to convert power to supply that coil. A DC link capacitor 307 (e.g., 700 VDC) is provided between the power rails 108, 110.

When the appropriate voltage is applied to the base of an IGBT 304-2 of the power converter 300, the switch (i.e., the IGBT) may be activated and the collector may be coupled electrically to the emitter to supply electric power. The base of each IGBT 304-2 may be coupled electrically to a respective gate driver 352 that is dedicated to that IGBT 304-2 and provides a low voltage (e.g., 24 VDC) to turn on and off that IGBT 304-2. The gate drivers 352 may be under the control of a microprocessor 354 (the microprocessor 354 and associated memory may be integrated on the same chip, such as a Texas Instruments chip) in common with those gate drivers 352 which may employ a pulse-width-modulation control scheme, such as one that is well-known to a person of ordinary skill in the art (e.g., space-vector modulation), to control the gate drivers 352, the IGBTs 304-2, and thus the IPM motor 302 (including varying the amplitudes and frequencies to the motor coils) so as to vary the torque output of that motor 302 when applicable. Each of the second, third, fourth, and fifth power electronics modules 350 may thus include the power converter 300, the gate drivers 352 (e.g., one for each IGBT 304-2), and the microprocessor 354.

In other examples, the forestry forwarder may utilize SR motors (e.g., each 30 kW continuous load capacity) instead of IPM motors for its electric traction motors. In such a case, each of the second, third, fourth, and fifth power electronics modules of the forwarder may be as described in connection with FIG. 3.

In general, the power electronics modules of the vehicle 10 (four-wheel drive loader, forestry forwarder, or other type of vehicle) may be under the control of a control system of the vehicle 10. The control system may be any appropriate type of control system used to control electric drive systems. The control system may include any appropriate type of sensors, controllers, microcontrollers, microprocessors, digital signal processors, memory modules, or other electronic components. The control system may also provide control functionalities to other components (not shown) of the vehicle 10.

The control system may include a master controller (or controllers) (not shown) that receives various inputs and outputs control signals to the microprocessors of the power electronics modules to control the generators, the motors, and the brake resistors. Such a master controller may output to the microprocessors of the first power electronics modules appropriate control signals representing DC voltage commands to control the DC voltage on the buses (normally at a constant nominal 700 VDC) and may output to the microprocessors of the traction motor power electronics modules appropriate control signals representing motor torque commands to control the torque output of the motors. Such control signals may be outputted in response to various inputs, such as, for example, a torque request (e.g., indicated by operator foot pedal position), feedback from appropriate sensors (e.g., rotor position, stator currents of the motors and generators, and DC bus voltage of each bus), etc., to name but a few of the various inputs that may be received by the master controller. The DC voltage on the buses and the engine torque may thus be varied in response to a variety of circumstances.

It is understood that each power electronics module may have one or more microprocessors. As alluded to above, there is just one such microprocessor for the gate drivers of the power electronics module. In other embodiments, a power electronics module may have more than one microprocessor, each microprocessor responsible for controlling some subset of the gate drivers of that module (e.g., dedicated microprocessor for each gate driver). One of ordinary skill in the art will recognize variations possible for the architecture of the control system.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A hybrid vehicle, comprising:
an engine,
a first traction element and a second traction element,
a first electric drive system and a second electric drive system, the first electric drive system comprising a first electric generator, a first direct current (DC) bus, and a first electric traction motor coupled electrically to the first electric generator via the first DC bus, the second electric drive system comprising a second electric generator, a second DC bus, and a second electric traction motor coupled electrically to the second electric generator via the second DC bus, a majority of power received by the first electric traction motor being provided by the first electric generator and a majority of power received by the second electric traction motor being provided by the second electric generator, the engine coupled operatively to the first electric generator and the second electric generator such that power from the engine is split between the first and second electric generators, the first electric traction motor coupled operatively to the first traction element, the second electric traction motor coupled operatively to the second traction element; and
a third traction element and a fourth traction element, wherein the second electric drive system comprises a third electric traction motor coupled electrically to the second electric generator via the second DC bus and operatively to the third traction element, the first electric drive system comprises a fourth electric traction motor coupled electrically to the first electric generator via the first DC bus and operatively to the fourth traction element, the first and second traction elements are positioned on opposite sides of a central fore-aft axis of the hybrid vehicle and are longitudinally aligned, the third and fourth traction elements are positioned on opposite sides of the central fore-aft axis of the hybrid vehicle and are longitudinally aligned, and the first and third traction elements are positioned on the same side of the central fore-aft axis of the hybrid vehicle in fore-aft relation to one another,
the first electric drive system including a plurality of power electronics modules coupled to the first DC bus and cooperating to monitor and regulate power transfer between the first electric generator and the first and fourth electric traction motors, the plurality of power electronics modules of the first electric drive system including a first generator power electronics module coupled electrically to the first electric generator for routing power generated by the first electric generator to the first DC bus, a first motor power electronics module coupled electrically to the first electric traction motor for routing power between the first DC bus and the first electric traction motor, and a fourth motor power electronics module coupled electrically to the fourth electric traction motor for routing power between the first DC bus and the fourth electric traction motor,
the second electric drive system including a plurality of power electronics modules coupled to the second DC bus and cooperating to monitor and regulate power transfer between the second electric generator and the second and third electric traction motors, the plurality of power electronics modules of the second electric drive system including a second generator power electronics module coupled electrically to the second electric generator for routing power generated by the second electric generator to the second DC bus, a second motor power electronics module coupled electrically to the second electric traction motor for routing power between the second DC bus and the second electric traction motor, and a third motor power electronics module coupled electrically to the third electric traction motor for routing power between the second DC bus and the third electric traction motor,
each of the plurality of power electronics modules of the first electric drive system and the second electric drive system including a processor operative to control the respective power routing and a power converter operative to convert between AC power and DC power.

2. The hybrid vehicle of claim 1, wherein the first and third traction elements are positioned on a first side of the central fore-aft axis of the hybrid vehicle, and the second and fourth elements are positioned on a second side of the fore-aft axis opposite the first side.

3. The hybrid vehicle of claim 2, wherein the first and second traction elements are respectively right and left forward traction elements positioned on opposite sides of the fore-aft axis of the hybrid vehicle, and the third and fourth traction elements are respectively right and left rearward fraction elements positioned on opposite sides of the fore-aft axis and rearward of the right and left forward fraction elements.

4. The hybrid vehicle of claim 1, wherein the first electric drive system comprises a first brake resistor coupled electrically to the first DC bus, and the second electric drive system comprises a second brake resistor coupled electrically to the second DC bus.

5. The hybrid vehicle of claim 4, wherein the processor of the first generator power electronics module is operative to control the dissipation of power from the first DC bus to the first brake resistor, and the processor of the second generator power electronics module is operative to control the dissipation of power from the second DC bus to the second brake resistor.

6. The hybrid vehicle of claim 1, wherein the plurality of power electronics modules of the first electric drive system cooperate to manage bi-directional power flow over the first DC bus, and the plurality of power electronics modules of the second electric drive system cooperate to manage bi-directional power flow over the second DC bus.

7. The hybrid vehicle of claim 1, further comprising a fifth traction element, a sixth fraction element, a seventh traction element, and an eighth traction element, the first electric drive system comprises a fifth electric traction motor coupled operatively to the fifth traction element and a sixth electric traction motor coupled operatively to the sixth traction element, the second electric drive system comprises a seventh electric traction motor coupled operatively to the seventh traction element and an eighth electric traction motor coupled operatively to the eighth fraction element, the first electric bus is coupled electrically to the first electric generator and the first, fourth, fifth, and sixth electric traction motors therebetween, and the second electric bus is coupled electrically to the second electric generator and the second, third, seventh, and eighth electric traction motors therebetween.

8. The hybrid vehicle of claim 1, wherein the first traction element is driven only by the first electric traction motor, and the second traction element is driven only by the second electric traction motor.

9. A hybrid vehicle, comprising:
an engine having an output,
a gearbox having an input, a first output, and a second output,
a rotational mechanical connection coupled to the engine output and to the gearbox input such that the engine output and the gearbox input are configured to rotate together,
a cooling fan coupled to and driven by the engine,
a first traction element and a second traction element,
a first electric drive system and a second electric drive system, the first electric drive system comprising a first electric generator, a first direct current (DC) bus, a first brake resistor coupled electrically to the first DC bus, and a first electric traction motor coupled electrically to the first electric generator via the first DC bus, the second electric drive system comprising a second electric generator, a second DC bus, a second brake resistor coupled electrically to the second DC bus, and a second electric traction motor coupled electrically to the second electric generator via the second DC bus, the engine coupled operatively to the first electric generator and the second electric generator such that power from the engine is split between the first and second electric generators, the first and second generators having a substantially same load capacity, the first electric traction motor coupled operatively to the first traction element, the second electric traction motor coupled operatively to the second traction element; and
a third traction element and a fourth traction element, wherein the second electric drive system comprises a third electric traction motor coupled electrically to the second electric generator via the second DC bus and operatively to the third traction element, the first electric drive system comprises a fourth electric traction motor coupled electrically to the first electric generator via the first DC bus and operatively to the fourth traction element, the first, second, third, and fourth electric fraction motors having a substantially same load capacity, the first and third traction elements are positioned on a first side of a central fore-aft axis of the hybrid vehicle, and the second and fourth traction elements are positioned on a second side of the central fore-aft axis opposite the first side, wherein the first and second traction elements are positioned relative to the central fore-aft axis at the same axial point as one another, and the third and fourth traction elements are positioned relative to the central fore-aft axis at the same axial point as one another,
the gearbox being operative to provide an increase in speed from the engine to each of the first and second electric generators,
the first electric drive system including a plurality of power electronics modules coupled to the first DC bus and cooperating to monitor and regulate power transfer between the first electric generator and the first and fourth electric traction motors, the plurality of power electronics modules of the first electric drive system including a first generator power electronics module coupled electrically to the first electric generator for routing power generated by the first electric generator to the first DC bus, a first motor power electronics module coupled electrically to the first electric traction motor for routing power between the first DC bus and the first electric traction motor, and a fourth motor power electronics module coupled electrically to the fourth electric traction motor for routing power between the first DC bus and the fourth electric traction motor,
the second electric drive system including a plurality of power electronics modules coupled to the second DC bus and cooperating to monitor and regulate power transfer between the second electric generator and the second and third electric traction motors, the plurality of power electronics modules of the second electric drive system including a second generator power electronics module coupled electrically to the second electric generator for routing power generated by the second electric generator to the second DC bus, a second motor power electronics module coupled electrically to the second electric traction motor for routing power between the second DC bus and the second electric traction motor, and a third motor power electronics module coupled electrically to the third electric traction motor for routing power between the second DC bus and the third electric traction motor,
each of the plurality of power electronics modules of the first electric drive system and of the second electric drive system including a processor operative to control the respective power routing and a power converter controlled by the processor, each power converter including a plurality of insulated gate bipolar junction transistors operative to convert between AC power and DC power, at least one of the plurality of power electronics modules of the first electric drive system being operative to control the dissipation of power from the first DC bus to the first brake resistor, at least one of the plurality of power electronics modules of the second electric drive system being operative to control the dissipation of power from the second DC bus to the second brake resistor, each of the first, second, third, and fourth motor power electronics modules being operative to control a power load to the respective first, second, third, and fourth electric traction motor.

10. The hybrid vehicle of claim 9, wherein a speed range of the engine includes engine speeds ranging from a zero speed to a maximum speed, and wherein the first and second electric generators are operative to provide a substantially same current output over the speed range of the engine.

11. The hybrid vehicle of claim 9, wherein a speed range of the engine includes engine speeds ranging from a zero speed to a maximum speed, and wherein the first and second electric generators have a substantially same efficiency rating over the speed range of the engine.

12. The hybrid vehicle of claim 9, wherein the first and second electric generators are each operative to initiate the generation of electric power at a substantially same speed of the engine.

13. The hybrid vehicle of claim 9, wherein the first and second traction elements are respectively right and left forward traction elements positioned on opposite sides of the fore-aft axis of the hybrid vehicle, and the third and fourth traction elements are respectively right and left rearward traction elements positioned on opposite sides of the fore-aft axis and rearward of the right and left forward traction elements.

14. A hybrid vehicle, comprising:
an engine having an output,
a gearbox having an input, a first output, and a second output,
a rotational mechanical connection coupled to the engine output and to the gearbox input such that the engine output and the gearbox input are configured to rotate together,
a first traction element and a second traction element, and
a first electric drive system and a second electric drive system, the first electric drive system comprising a first electric generator coupled to the first output of the gearbox and a first electric traction motor coupled electrically to the first electric generator via a first power path extending from the first electric generator to the first electric fraction motor, the second electric drive system comprising a second electric generator coupled to the second output of the gearbox and a second electric traction motor coupled electrically to the second electric generator via a second power path extending from the second electric generator to the second electric traction motor, the first power path including a first electric bus and the second power path including a second electric bus, the first and second power paths being separate from one another, the engine coupled operatively to the first electric generator and the second electric generator via the rotational mechanical connection and the gearbox such that power from the engine is split between the first and second electric generators, the first electric traction motor coupled operatively to the first fraction element, the second electric traction motor coupled operatively to the second traction element; and
a third traction element and a fourth traction element, wherein the second electric drive system comprises a third electric traction motor coupled electrically to the second electric generator via the second power path and operatively to the third traction element, the first electric drive system comprises a fourth electric traction motor coupled electrically to the first electric generator via the first power path and operatively to the fourth traction element, the first and second traction elements are positioned on opposite sides of a central fore-aft axis of the hybrid vehicle and are longitudinally aligned, the third and fourth traction elements are positioned on opposite sides of the central fore-aft axis of the hybrid vehicle and are longitudinally aligned, the first and third traction elements are positioned on a first side of the central fore-aft axis of the hybrid vehicle in fore-aft relation to one another, and the second and fourth traction elements are positioned on a second side of the fore-aft axis opposite the first side,
the first electric drive system including a plurality of power electronics modules coupled to the first electric bus and cooperating to monitor and regulate power transfer between the first electric generator and the first and fourth electric traction motors, the plurality of power electronics modules of the first electric drive system including a first generator power electronics module coupled electrically to the first electric generator for routing power generated by the first electric generator to the first electric bus, a first motor power electronics module coupled electrically to the first electric fraction motor for routing power between the first electric bus and the first electric traction motor, and a fourth motor power electronics module coupled electrically to the fourth electric traction motor for routing power between the first electric bus and the fourth electric traction motor,
the second electric drive system including a plurality of power electronics modules coupled to the second electric bus and cooperating to monitor and regulate power transfer between the second electric generator and the second and third electric traction motors, the plurality of power electronics modules of the second electric drive system including a second generator power electronics module coupled electrically to the second electric generator for routing power generated by the second electric generator to the second electric bus, a second motor power electronics module coupled electrically to the second electric fraction motor for routing power between the second electric bus and the second electric traction motor, and a third motor power electronics module coupled electrically to the third electric traction motor for routing power between the second electric bus and the third electric traction motor,
each of the plurality of power electronics modules of the first electric drive system and the second electric drive system including a processor operative to control the respective power routing and a power converter operative to convert between AC power and DC power.

15. The hybrid vehicle of claim 14, wherein the first motor power electronics module is configured to control a load provided by the first electric generator to the first electric traction motor and the second motor power electronics module is configured to control a load provided by the second electric generator to the second electric traction motor.

16. The hybrid vehicle of claim 14, wherein the first generator power electronics module and the first and fourth motor power electronics modules cooperate to control a voltage level on the first electric bus and the second generator power electronics module and the second and third motor power electronics modules cooperate to control a voltage level on the second electric bus, and the voltage level of the first and second electric buses are substantially the same.

17. The hybrid vehicle of claim 14, wherein the first and second traction elements are respectively right and left forward traction elements positioned on opposite sides of the fore-aft axis of the hybrid vehicle, and the third and fourth traction elements are respectively right and left rearward traction elements positioned on opposite sides of the fore-aft axis and rearward of the right and left forward traction elements.

18. The hybrid vehicle of claim 14, wherein the first electric drive system includes a first brake resistor coupled electrically to the first electric bus, the second electric drive system comprises a second brake resistor coupled electrically to the second electric bus, the processor of the first generator power electronics module is operative to control the dissipation of power from the first electric bus to the first brake resistor, and the processor of the second generator power electronics module is operative to control the dissipation of power from the second electric bus to the second brake resistor.

\* \* \* \* \*